(12) United States Patent
Rowse et al.

(10) Patent No.: US 8,452,236 B2
(45) Date of Patent: May 28, 2013

(54) ELECTRONIC DEVICE AND A METHOD FOR TRANSFER OF DATA

(75) Inventors: Graham Lawrence Rowse, Hampshire (GB); Joe Pendlebury, Hampshire (GB)

(73) Assignee: Nokia Corporation, Espoo (FI)

( * ) Notice: Subject to any disclaimer, the term of this patent is extended or adjusted under 35 U.S.C. 154(b) by 914 days.

(21) Appl. No.: 11/885,030

(22) PCT Filed: Mar. 1, 2005

(86) PCT No.: PCT/IB2005/000549
§ 371 (c)(1),
(2), (4) Date: Aug. 11, 2008

(87) PCT Pub. No.: WO2006/092646
PCT Pub. Date: Sep. 8, 2006

(65) Prior Publication Data
US 2009/0215392 A1    Aug. 27, 2009

(51) Int. Cl.
*H04B 7/00*    (2006.01)
*H04B 1/00*    (2006.01)

(52) U.S. Cl.
USPC .......................................... 455/41.2; 455/68

(58) Field of Classification Search
USPC ............. 455/41.2, 412.1, 412.2, 552.1, 456.3
See application file for complete search history.

(56) References Cited

U.S. PATENT DOCUMENTS

| | | | | |
|---|---|---|---|---|
| 6,088,587 | A * | 7/2000 | Abbadessa | 455/424 |
| 6,925,288 | B2 * | 8/2005 | McDonnell et al. | 455/41.2 |
| 2001/0029166 | A1 * | 10/2001 | Rune et al. | 455/41 |
| 2003/0003912 | A1 * | 1/2003 | Melpignano et al. | 455/436 |
| 2003/0208522 | A1 * | 11/2003 | McDonnell et al. | 709/201 |
| 2004/0077313 | A1 | 4/2004 | Oba et al. | 455/41.2 |
| 2005/0172026 | A1 * | 8/2005 | Jeon et al. | 709/228 |

FOREIGN PATENT DOCUMENTS

| | | |
|---|---|---|
| EP | 1 312 066 B1 | 6/2004 |
| WO | WO 01/86420 A2 | 11/2001 |
| WO | WO 2004/021259 A1 | 3/2004 |

* cited by examiner

*Primary Examiner* — Yuwen Pan
*Assistant Examiner* — Ayodeji Ayotunde
(74) *Attorney, Agent, or Firm* — Harrington & Smith

(57) ABSTRACT

A first electronic device includes a radio transceiver for receiving a name request message from a second electronic device and for responding with a name reply message including data in addition to or as an alternative to a name. The second electronic device includes a radio transceiver for transmitting the name request message and for receiving in reply the name reply message; and extraction means for extracting from the received name reply message the data that is included in the name reply message as an addition to or as an alternative to a name. The data may be a URI and the first device may be an advertiser device.

26 Claims, 3 Drawing Sheets

ELECTRONIC DEVICE AND A METHOD FOR TRANSFER OF DATA

FIELD OF THE INVENTION

Embodiments of the present invention relate to an electronic device and a method for transfer of data. In particular, they relate to transfer of data using Bluetooth.

BACKGROUND TO THE INVENTION

As technology progresses, users are becoming more demanding and expect faster access to remote services when using electronic devices.

As an example, when a mobile electronic device user sees an advertisement with a URI indicating that more information or a competition etc can be found on the internet, they may be discouraged from accessing the service provided by the URI because typing in the URI is a slow, cumbersome and error prone, especially with small mobile devices, as is the correction process when an error is made.

EP1312066 improves the speed of access to a URI by a user. It discloses an advertisement system in which an advertiser device, containing an advertisement that is directly perceptible to a user of a nearby consumer device without mediation of the consumer device, downloads using Bluetooth an identification of an advertisement, e.g. a URI, to the consumer device for enabling subsequent download and upload of data to and from the consumer device. It is silent as to how the URI is transferred from the advertiser device to the consumer device using Bluetooth.

When a user of a first Bluetooth device wishes to obtain access to a service offered by a local device, the first Bluetooth device initiates an Device Discovery (inquiry) procedure to discover which devices are in range. The Bluetooth devices within range respond with an inquiry response including their Bluetooth Device Address. The first Bluetooth device then pages, in turn, each of the devices that are in range and requests the device's user-friendly name using the 'Name Discovery' procedure. Name Discovery provides an initiator with the Bluetooth Device Name of a connectable devices (i.e. a device within range that will respond to paging). The initiator device sends a LMP_name_req message to a connectable device which responds with an LMP_name_res message containing a Bluetooth Device Name. The Bluetooth Device Name is a user-friendly character string associated with a device and consists of a maximum of 248 bytes and is encoded using UTF-8. After obtaining all the names, the first Bluetooth device then starts the Service Discovery Protocol (SDP). It interrogates the other devices to determine if any of them are candidates for providing a service. The other devices reply with an indication of the services that are provided and the protocols that are used. The service provided is indicated using service attributes including a service name. The list of candidate devices is then displayed to the user of the first device. The user-friendly names obtained via Name Discovery are used to identify the candidate devices and the user can consequently make an informed selection of which device should be used to provide the required service. The full link establishment procedure is only then performed with the selected device.

The Service Discovery Protocol (SDP) provides a mechanism for discovering services and their attributes. A service is any entity that can provide information, perform an action or control a resource on behalf of another entity. All of the information about a service is contained in a single service record that consists of a list of service attributes.

One way of providing a URI from one Bluetooth device to another Bluetooth device is by placing it in one of the service attributes of a service record maintained at the advertiser device. The URI would then be transferred during the SDP.

However, the inventors have realized that the process of connecting to each connectable device to request its user-friendly name (the 'Name Request' procedure) is time consuming. Each connection requires a paging procedure which can take up to 2.5 seconds. Therefore there may be some delay in initiating the Service Discovery Protocol and gaining access to the required service.

It would be desirable to improve the speed at which a user can access a service using a mobile device.

BRIEF DESCRIPTION OF THE INVENTION

According to one embodiment of the invention there is provided an electronic device comprising: a radio transceiver for receiving a name request message and for responding with a name reply message comprising data in addition to or as an alternative to a name.

According to another embodiment of the invention there is provided a computer program comprising computer program instructions for enabling an electronic transceiver device to respond to a received name request message by transmitting a name reply message comprising data in addition to or as an alternative to a name. The computer program may be embodied on a computer readable medium or carrier or a memory.

According to another embodiment of the invention there is provided a method for transferring data from an electronic device to another electronic device comprising: receiving at the electronic device a name request message from the another electronic device; and transmitting, in reply, a name reply message, comprising data in addition to or as an alternative to a name, from the electronic device to the another electronic device.

The data may be delimited in a predetermined manner either explicitly or implicitly.

The data may specify a URI. The electronic device may be attached to an advertisement.

The electronic device may further comprise a programmable memory for storing the data and means for reading the data from the memory for inclusion in a name reply message. When ready for use, the memory stores the data. The electronic device may further comprise a rechargeable battery and a solar cell for recharging the battery.

The name request message may be directly addressed to the electronic device using an identifier of the electronic device and the name reply message may be directly addressed to the another device using an identifier of the another device. The electronic device and another electronic device may be synchronized in time to a clock of the another device during the message exchange. The electronic device and another electronic device may be synchronized in frequency to a frequency hopping sequence of the another device during the message exchange.

The name request message and name reply message may be part of the Bluetooth Name Discovery procedure. The reception of the name request message may be directly preceded by paging as in, for example, the Bluetooth Name Discovery procedure. The name request message may a LMP_name_req message and the name reply message may be a LMP_name_res message, which are the messages used in the Bluetooth Name Discovery procedure.

According to further embodiment of the invention there is provided an electronic device comprising: a radio transceiver for transmitting a name request message and for receiving in reply a name reply message; and extraction means for extracting from the received name reply message data that is included in the name reply message as an addition to or as an alternative to a name. The extraction means may identify the data according to one or more delimiters within the name reply message. The delimiters may be explicit or implicit.

The electronic device may automatically initiate a communication process using the extracted data. For example, the initiated communication process may involve a data call in a cellular telecommunications network, although user confirmation may be required before the call is made.

The extracted data may specify a URI. The electronic device may be a hand-portable mobile device.

The name request message and name reply message may be part of the Bluetooth Name Discovery procedure. The reception of the name request message may be directly preceded by paging as in the Bluetooth Name Discovery procedure. The name request message may be a LMP_name_req message and the name reply message may be a LMP_name_res message, which are the messages used in the Bluetooth Name Discovery procedure.

According to another embodiment of the invention there is provided a computer program comprising computer program instructions for enabling an electronic transceiver device to respond to a received name reply message by extracting data that is included in the name reply message as an addition to or as an alternative to a name.

According to another embodiment of the invention there is provided a method for transferring data from a first device to a second device comprising: transmitting a name request message from the second device to the first device; receiving at the second device, a name reply message from the first device transmitted in reply to the name request message; and extracting from the received name reply message data that is included in the name reply message as an addition to or as an alternative to a name.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
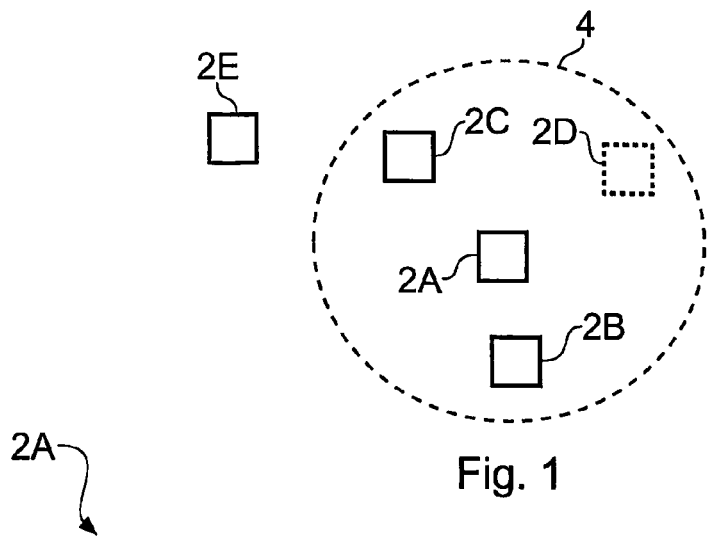
FIG. 1 illustrates an arrangement of Bluetooth devices.

FIG. 1 illustrates an arrangement of Bluetooth devices 2 some of which may be mobile and some of which may be stationary. In this example, devices 2B, 2C and 2D are within range 4 of an initiator device 2A but device 2E is not within range 4. Devices 2B, 2C and 2E are responsive at present. Consequently, only devices 2B and 2C are connectable to the initiator device 2A.

Figure 2:
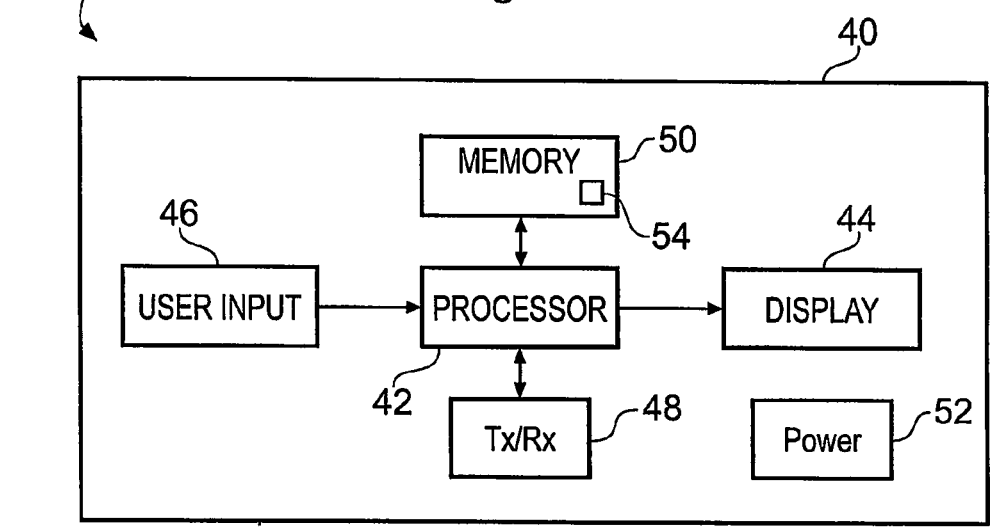
FIG. 2 illustrates a device 40 that is suitable for use as an initiator device.

FIG. 2 illustrates a device 40 that is suitable for use as an initiator device 2A. The device 2A is typically a hand-portable mobile electronic device. In this example, the device 40 comprises: a processor 42, a display 44, a user input device 46 such as a keypad, joystick etc, a low power radio frequency transceiver 48, a memory 50 and a power source 52. The processor 42 is connected to receive input commands from the user input device 46 and provide output commands to the display 44 for controlling the image displayed. The processor 42 is also connected to provide data to and receive data from the radio transceiver 48 and to read from and write to the memory 50. The processor 42 may also be connected to functional circuitry (not shown), such a cellular radio transceiver if it is operable as a mobile cellular telephone.

The memory 50 is used for storing computer program instructions 54 that control the operation of the electronic device 40 when loaded into the processor 42. The computer program instructions 54 provide the logic and routines that enables the electronic device to perform the method illustrated in FIG. 4.

The computer program instructions 54 may arrive at the electronic device 42 via an electromagnetic carrier signal or be copied from a physical entity such as a computer program product, a memory device or a record medium such as a CD-ROM or DVD. The computer program instructions 54 may be conveniently supplied as a JAVA Applet.

Figure 3:
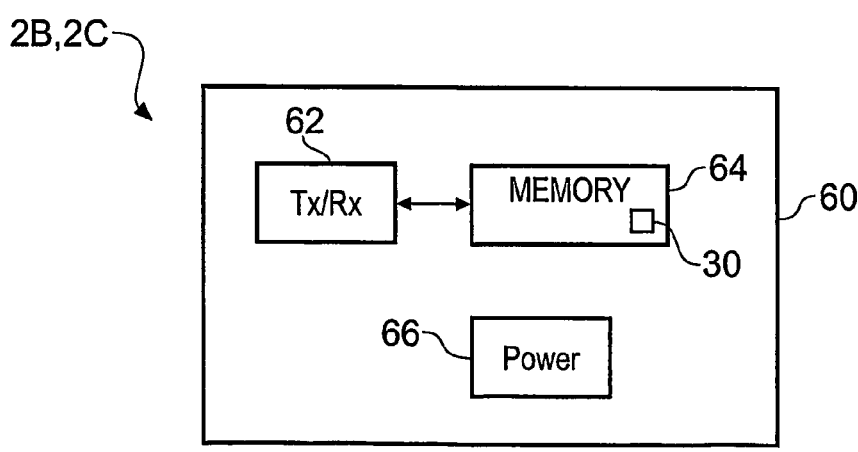
FIG. 3 illustrates a device 60 that is suitable for use as a connectable device.

FIG. 3 illustrates a device 60 that is suitable for use as one of the connectable devices 2B, 2C. Only the minimum components are illustrated and described. The devices 2B, 2C may be a hand-portable mobile electronic devices or stationary devices. In this example, the device 60 comprises: a low power radio frequency transceiver 62, a memory 64 and a power source 66.

The memory 50 is used for storing the additional data 30. The power source 66 may in some instances be a rechargeable battery connected to a solar cell.

Figure 4:
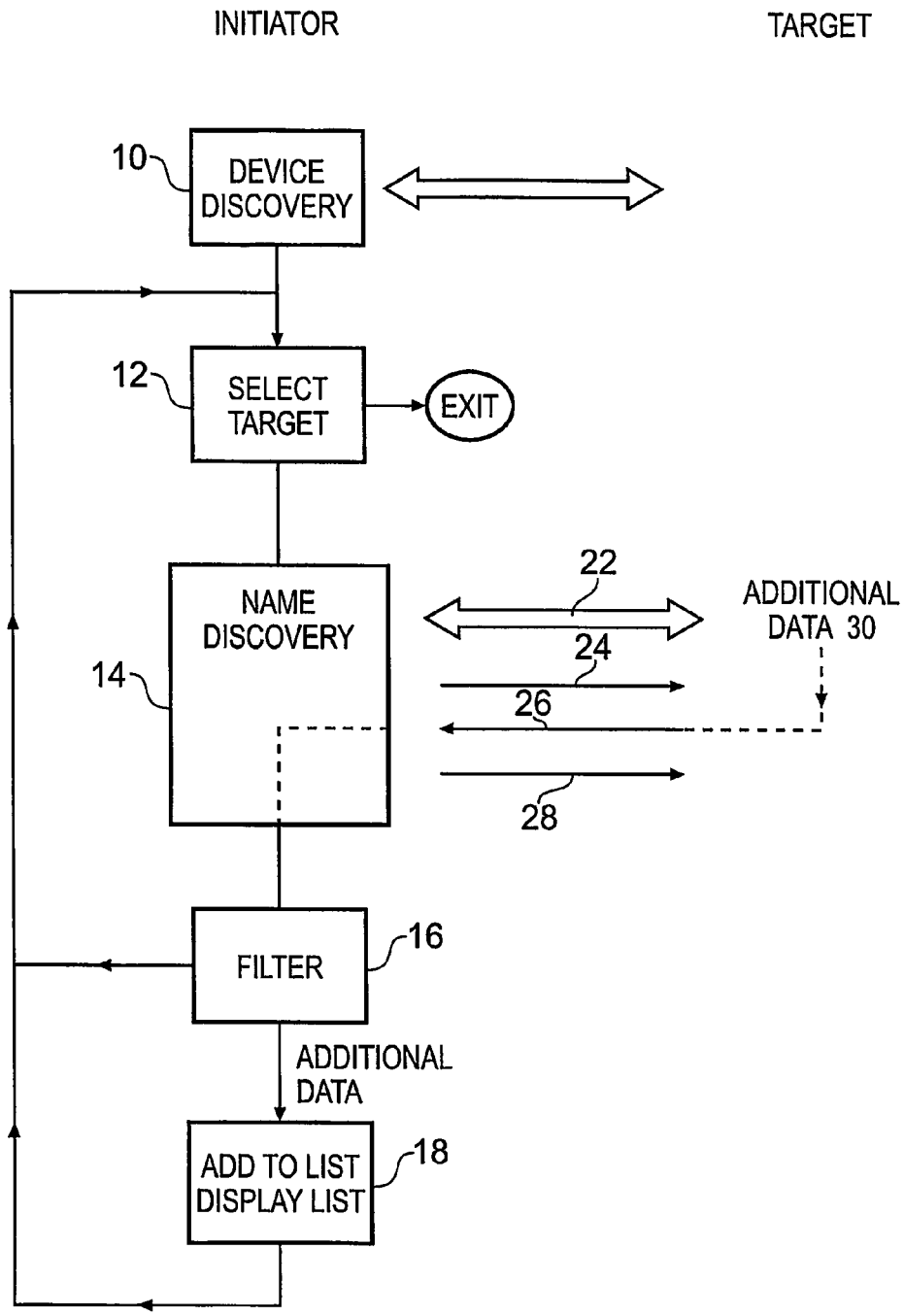
FIG. 4 illustrates a process by which an initiator device interrogates a connectable device to enable fast access to a service provided by the connectable device.

The process 21 by which the initiator device interrogates the connectable devices 2B and 2C to enable fast access to a service provided by these devices is illustrated in FIG. 4.

At step 10, the initiator device 2A performs 'device discovery' in order to discover other devices with which the device can communicate. The initiator device 2A enters an inquiry sub-state in which it repeatedly transmits, using transceiver 48, an inquiry message (ID packet) at different hop frequencies. Devices 2B, 2C and 2E that allows themselves to be discovered, regularly enter an inquiry scan sub-state, in which the device can respond, using transceiver 62, to an inquiry message with an FHS packet that includes that device's Bluetooth Device Address (BD_ADDR) and its Bluetooth Clock value (CLK). The result of the Device Discovery procedure is a listing of the BD_ADDR and CLK for each connectable device 2B, 2C which is stored in memory 50.

At step 12, a loop 20 is entered using the first entry in the listing as a target. The loop 20 comprises steps 12, 14, 16 and 18. After step 18, the loop 20 is re-entered using the next entry in the listing as a target at step 12. The loop is terminated at step 12 when there are no remaining entries in the listing or it is terminated at any time in response to a user selection process (not illustrated) and described in more detail below.

At step 14, the initiator device 2A performs Name Discovery. The initiator device 2A pages 22 the target using transceiver 48. The initiator device 2A uses the target's Bluetooth Clock value to emulate its Bluetooth clock and uses the target's Bluetooth Device Address to emulate its frequency hopping sequence. During paging, an FHS packet that includes the initiator device's Bluetooth Device Address (BD_ADDR) and its Bluetooth Clock value (CLK) is sent, using transceiver 48, to the target. This allows the target to emulate the clock of the initiator device 2A and its hopping sequence. The initiator device 2A and the target are thus synchronized in time and frequency.

The initiator device 2A then sends, using transceiver 48, a LMP_name_req message 24 to the target. The target responds, using transceiver 62, with an LMP_name_res message 26. Then the initiator device 2A terminates the Name Discovery procedure for the target by sending, using the transceiver 48, an LMP_detach message 28 to the target. This ends the Name Discovery procedure for this target device.

The name field in the LMP_name_res message 26 that in the prior art only took the Bluetooth Device Name now alternatively or additionally takes 'additional' data 30. This additional data is stored in memory 84 in a target.

The amount of additional data 30 is limited to a maximum of 248 bytes. It may be encoded using the UTF-8 standard. The additional data 30 may be for any suitable purpose. It may, for example, provide information about the target or about a service offered by the target. It may enable the initiator device 2A to access content or services. In one example, described in more detail below, the additional data 30 is a Uniform Resource Identifier (URI).

The name field in the LMP_name_res message 26 delimits the additional data 30 so that on receipt at the initiator device 2A the additional data 30 can be distinguished from a Bluetooth Device Name. The delimitation may be implicit and arise from the nature of the data itself. For example, content in the name field that begins with 'http://', 'ftp://' etc could be treated on receipt as additional data 30. The delimitation may also be explicit. For example, additional data 30 may be preceded and optionally terminated by a character or characters such as a space, *, % etc. The nature of the delimiters used or usable at the target for delimiting the additional data 30 is predetermined in the sense that the initiator device 2A must also have knowledge of the usable delimiters to identify the additional data 30 in the received LMP_name_res message 26.

The received LMP_name_res message 26 is then filtered at step 16 at the initiator device 2A to extract automatically any additional data 30 present in the message. The initiator device 2A uses its knowledge about the delimiter(s) used for the additional data 30 to parse the content of the LMP_name_res message and extract the Bluetooth Device Name and/or the additional data 30. The content of the LMP_name_res message 26 may include only a Bluetooth Device Name or only additional data 30 or both a Bluetooth Device Name and additional data 30.

If the LMP_name_res message 26 includes additional data 30, then at step 18 the additional data 30 is stored in memory 50 and associated with an option presented to the user of the initiator device 2A via display 44. This option is added to a list of options previously presented during the currency of the loop 20, if any.

The loop then returns to step 12, where the loop 20 is re-entered using the next entry in the listing as a target.

Selection of a listed option by the user, using the user input device 46, at any time, enables the use of the additional data 30 associated with the selected option and terminates the loop 20.

The process 21, includes steps that are common to a current Bluetooth device. For example, the Device Discovery step 10, the loop entry/exit step 12 and the Name Discovery step 14 are performed in a current Bluetooth device. The process 21 is different in that the loop 20 has been extended to include the filter step 16 for extracting additional data 30, the display step 18 in which selectable options are provided immediately and a new termination step that occurs when a displayed option is selected.

Figure 5:
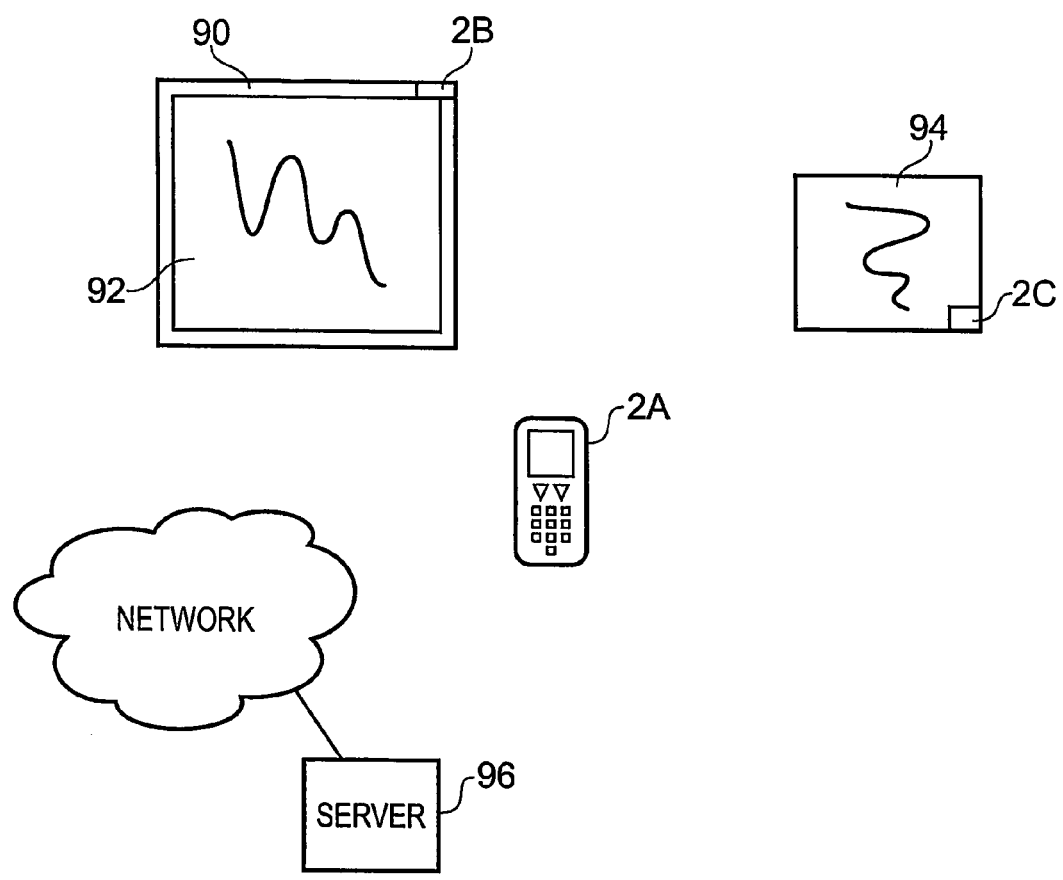
FIG. 5 illustrates a mobile cellular telephone as an initiator device and advertiser devices as connectable devices.

In one application of the invention, illustrated in FIG. 5, the initiator device 2A is a mobile cellular telephone, personal computer, personal digital assistant or similar and the target devices are advertiser devices 2B, 2C.

An advertiser device 2B, 2C is typically a device attached to a visual advertisement such as a poster or similar or to the billboard or physical medium carrying the visual advert. The advertisement is directly perceptible to a user of the initiator device without mediation of the initiator device.

In this example, the advertiser device 2B is attached to a billboard 90 carrying advertisement 92 and the advertiser device 2C is attached to advertisement 94. The transceiver 62, memory 64 and power supply 66 of the advertisement device 2C is integrated in a sticker attached to the visual advertisement 94. Each of the memories 64 in the respective advertisement devices 2B, 2C store additional data 30 for transmission by the advertisement device in a LMP_name_res message when it receives a LMP_name_req message. For the advertisement device 2B, the additional data 30 is a URI to a web-site offering a promotion such as entering a competition, playing a game, entering a prize draw or collecting a token. For the advertisement device 2C, the additional data 30 is a URI to a web-site that plays a video of the current television advertisement and provides additional information about the product or service advertised in the advertisement 94.

The user of a mobile cellular telephone 2A may be waiting for a train in a train station, when an advert catches his eye. He selects an option in his phone that starts a browser application and performs the process described with reference to FIG. 4. As each URI is received from the local advertiser device 2B, 2C in the respective received LMP_name_res messages, the mobile telephone 2A displays an option to the user for the URI. Selection of the option directs the browser to the selected URI.

The physical link for accessing the URI may be via a Bluetooth network, perhaps mediated by the advertiser device associated with the selected URI, via a cellular telecommunications network or via a WLAN network. Typically, the physical link is established automatically when the URI is selected.

The URIs associated with the various advertiser devices may point to different servers or alternatively they may point to a shared server 96. A shared server advantageously enables the use of short non-user friendly URIs e.g. http://nokia.com/1/4/6/7. The URI at the shared server stores all promotional material etc or allows further links to other servers. The owner of the shared server may charge each user, perhaps via a connection charge, or each advertiser for this service.

The arrangement enables a user of an electronic device 2A to visit a site associated with an advertisement 92, 94 on a whim as the time to set-up the visit is short.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An electronic device comprising:
a radio transceiver configured to receive a name request message addressed to the electronic device and configured to respond with a name reply message, the name reply message comprising data in addition to or as an alternative to a name;
wherein the reception of the name request message is directly preceded by paging of the electronic device in consequence of a device discovery inquiry procedure.

2. An electronic device as claimed in claim 1 wherein the data is delimited in a predetermined manner.

3. An electronic device as claimed in claim 1, wherein the data specifies a URI.

4. An electronic device as claimed in claim 1, wherein the electronic device is attached to an advertisement.

5. An electronic device as claimed in claim 1, further comprising a programmable memory for storing the data and a processor configured for reading the data from the memory for inclusion in a name reply message.

6. An electronic device as claimed in claim 1, further comprising a memory storing the data and a processor configured for reading the data from the memory for inclusion in a name reply message.

7. An electronic device as claimed in claim 1, further comprising a rechargeable battery and a solar cell for recharging the battery.

8. An electronic device as claimed in claim 1, wherein the name request message and name reply message are part of the Bluetooth Name Discovery procedure.

9. An electronic device as claimed in claim 1, wherein the paging is from a second device to synchronize the electronic device in time and frequency with the second device and wherein the name reply message is addressed to the second device.

10. An electronic device as claimed in claim 8, wherein the name request message is a LMP_name_req message and the name reply message is a LMP_name_res message.

11. A non-transitory computer readable medium embodying program code to perform a method comprising:
receiving at a first device a name request message addressed to the first device from a second device; and
in response to the name request message, transmitting a name reply message from the first device to the second device, the name reply message comprising data in addition to or as an alternative to a name;
wherein the reception of the name request message is directly preceded by paging of the electronic device in consequence of a device discovery inquiry procedure.

12. A method comprising:
receiving at a first device a name request message addressed to the first device from a second device; and
in response to the name request message, transmitting a name reply message from the first device to the second device, the name reply message comprising data in addition to or as an alternative to a name;
wherein the reception of the name request message is directly preceded by paging of the electronic device in consequence of a device discovery inquiry procedure.

13. An electronic device comprising:
a radio transceiver configured to transmit a name request message addressed to a first device and configured to receive in reply a name reply message; and
a processor configured to extract from the received name reply message data that is included in the name reply message as an addition to or as an alternative to a name;
wherein transmission of the name request message is directly preceded by paging from the electronic device in consequence of a device discovery inquiry procedure.

14. An electronic device as claimed in claim 13, wherein the processor is configured to identify the data according to a one or more delimiters within the name reply message.

15. An electronic device as claimed in claim 13, wherein the electronic device is configured to automatically initiate a communication process using the extracted data.

16. An electronic device as claimed in claim 15, wherein the communication process involves a data call in a cellular telecommunications network.

17. An electronic device as claimed in claim 13, wherein the extracted data specifies a URI.

18. An electronic device as claimed in claim 13, wherein the electronic device is hand-portable mobile device.

19. An electronic device as claimed in claim 13, wherein the name request message and name reply message are part of the Bluetooth Name Discovery procedure.

20. An electronic device as claimed in claim 13, wherein the paging from the electronic device is to synchronize the electronic device in time and frequency with the first device the name request message is addressed to and wherein the name reply message is addressed to the electronic device.

21. An electronic device as claimed in claim 19, wherein the name request message is a LMP_name_req message and the name reply message is a LMP_name_res message.

22. A non-transitory computer readable medium embodying program code to perform a method comprising:
transmitting a name request message addressed to a first device from a second device to the first device;
receiving at the second device a name reply message from the first device transmitted in reply to the name request message; and
extracting from the received name reply message data that is included in the name reply message as an addition to or as an alternative to a name;
wherein transmission of the name request message is directly preceded by paging from the electronic device in consequence of a device discover inquiry procedure.

23. A method comprising:
transmitting a name request message addressed to a first device from a second device to the first device;
receiving at the second device a name reply message from the first device transmitted in reply to the name request message; and
extracting from the received name reply message data that is included in the name reply message as an addition to or as an alternative to a name;
wherein transmission of the name request message is directly preceded by paging from the electronic device in consequence of a device discovery inquiry procedure.

24. An electronic device as claimed in claim 1 wherein the radio transceiver is a low power radio frequency transceiver.

25. A method as claimed in claim 12 wherein the paging from the second device is to synchronize the first device in time and frequency with the second device.

26. A method as claimed in claim 23 wherein paging from the second device is to synchronize the first device in time and frequency with the second device.

* * * * *

UNITED STATES PATENT AND TRADEMARK OFFICE
CERTIFICATE OF CORRECTION

PATENT NO. : 8,452,236 B2  
APPLICATION NO. : 11/885030  
DATED : May 28, 2013  
INVENTOR(S) : Graham Lawrence Rowse et al.

Page 1 of 1

It is certified that error appears in the above-identified patent and that said Letters Patent is hereby corrected as shown below:

In the Claims:

In Claim 22:
Column 8, line 42, "discover" should be --discovery--.

Signed and Sealed this
Twenty-third Day of July, 2013

Teresa Stanek Rea
*Acting Director of the United States Patent and Trademark Office*